(12) United States Patent
Peterson

(10) Patent No.: US 8,903,713 B2
(45) Date of Patent: Dec. 2, 2014

(54) METHOD AND APPARATUS FOR AUTOMATICALLY ANALYZING NATURAL LANGUAGE TO EXTRACT USEFUL INFORMATION

(76) Inventor: Richard L. Peterson, Los Angeles, CA (US)

(*) Notice: Subject to any disclaimer, the term of this patent is extended or adjusted under 35 U.S.C. 154(b) by 472 days.

(21) Appl. No.: 13/300,573

(22) Filed: Nov. 19, 2011

(65) Prior Publication Data

US 2013/0132071 A1 May 23, 2013

(51) Int. Cl.
*G06F 17/27* (2006.01)
(52) U.S. Cl.
USPC ................................ 704/9; 704/257; 704/251
(58) Field of Classification Search
USPC ............... 704/1–10, 251, 255, 257, 272, 270; 705/36 R; 713/200; 1/1
See application file for complete search history.

(56) References Cited

U.S. PATENT DOCUMENTS

| 6,775,663 B1* | 8/2004 | Kim ........................................ 1/1 |
| 2002/0120858 A1* | 8/2002 | Porter et al. .................. 713/200 |
| 2009/0259459 A1* | 10/2009 | Ceusters et al. ................... 704/9 |
| 2010/0257117 A1* | 10/2010 | Shvadron et al. ........... 705/36 R |
| 2013/0124192 A1* | 5/2013 | Lindmark et al. ................ 704/9 |

* cited by examiner

*Primary Examiner* — Huyen X. Vo
(74) *Attorney, Agent, or Firm* — Mersenne Law LLP

(57) ABSTRACT

An automatic language-processing system uses a human-curated lexicon to associate words and word groups with broad sentiments such as fear or anger, and topics such as accounting fraud or earnings projections. Grammar processing further characterizes the sentiments or topics with logical ("is" or "is not"), conditional (probability), temporal (past, present, future), quantitative (larger/smaller, higher/lower, etc.), and speaker identification ("I" or "He" or "Alan Greenspan") measures. Information about the characterized sentiments and topics found in electronic messages is stored in a database for further analysis, display, and use in automatic trading systems.

2 Claims, 4 Drawing Sheets

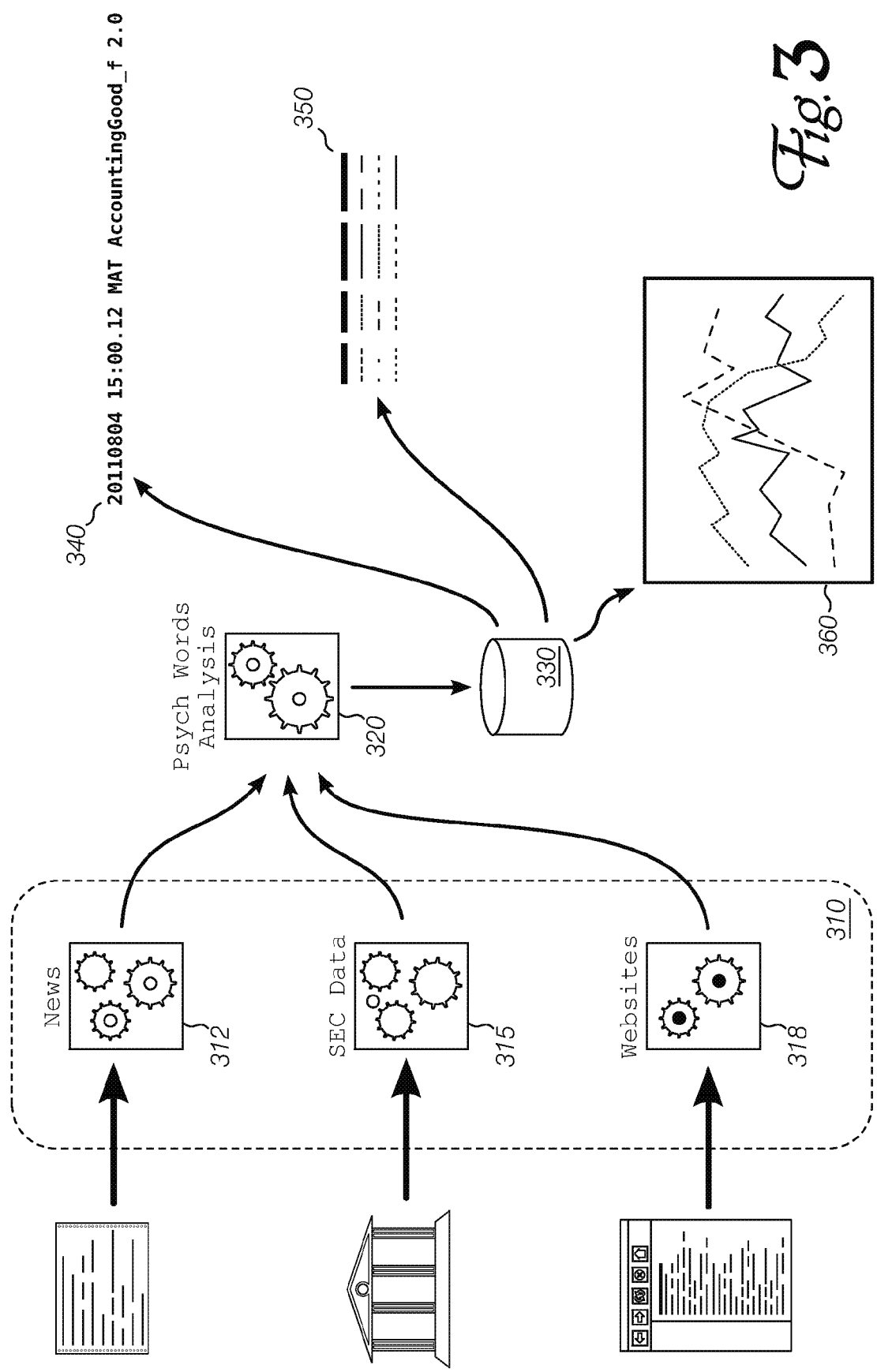

| Ticker | Date | CompanyName | Sector | Source | Author |
|---|---|---|---|---|---|
| XRT | 20110501 | SPDR S&P Retail | Consumer Goods | SocialMedia | NULL |
| COPX | 20110501 | Global X Copper Miners ETF | Basic Materials | SocialMedia | NULL |
| XLI | 20110501 | Industrial Select Sector SPDR | Basic Materials | SocialMedia | NULL |
| IYC | 20110501 | iShares Dow Jones US Consumer Services | Services | SocialMedia | NULL |
| XLB | 20110501 | Materials Select Sector SPDR | Basic Materials | SocialMedia | NULL |
| PEJ | 20110501 | PowerShares Dynamic Leisure & Entertain | Consumer Goods | SocialMedia | NULL |
| BJK | 20110501 | Market Vectors Gaming ETF | Consumer Goods | SocialMedia | NULL |
| IEZ | 20110501 | iShares Dow Jones US Oil Equipment Index | Basic Materials | SocialMedia | NULL |
| ITA | 20110501 | iShares Dow Jones US Aerospace & Defense | Industrial Goods | SocialMedia | NULL |

410 Ticker, 420 Date, 430 CompanyName, 440 Sector, 450 Source, 460 Author, 470 AccountingBad/AccountingGood, 480

| AccountingBad | AccountingGood |
|---|---|
| 0.01333 | 0.01532 |
| 0.00811 | 0.00995 |
| 0.01092 | 0.01314 |
| 0.01447 | 0.01525 |
| 0.00895 | 0.01462 |
| 0.01115 | 0.01552 |
| 0.01163 | 0.01518 |
| 0.00701 | 0.00703 |
| 0.00955 | 0.0101 |

| Ambiguity | Anger | Anxiety | Apologetic | Avoiding | BadDebt | Bargain | Bear | Big | Blocking | Bull |
|---|---|---|---|---|---|---|---|---|---|---|
| 0.00095 | 0.00629 | 0.0055 | 0.00438 | 0.00384 | 0.00006 | 0.00569 | 0.05887 | 0.03331 | 0.00929 | 0.04593 |
| 0.00052 | 0.00662 | 0.00572 | 0.00657 | 0.00403 | 0.0001 | 0.00329 | 0.04811 | 0.02603 | 0.00901 | 0.03678 |
| 0.00116 | 0.00727 | 0.00612 | 0.00408 | 0.00457 | 0.0001 | 0.00403 | 0.05608 | 0.03163 | 0.0083 | 0.04197 |
| 0.00101 | 0.00553 | 0.00521 | 0.00382 | 0.00433 | 0.00011 | 0.00868 | 0.05569 | 0.04536 | 0.01363 | 0.05122 |
| 0.00125 | 0.00686 | 0.00651 | 0.00477 | 0.0048 | 0.00003 | 0.00497 | 0.05433 | 0.03155 | 0.00888 | 0.03717 |
| 0.00088 | 0.00638 | 0.00449 | 0.00369 | 0.0029 | 0.00011 | 0.0043 | 0.05699 | 0.03292 | 0.00939 | 0.04797 |
| 0.00068 | 0.00752 | 0.00513 | 0.00415 | 0.00289 | 0.0003 | 0.00393 | 0.06039 | 0.03128 | 0.00776 | 0.04628 |
| 0.00142 | 0.0124 | 0.00673 | 0.00482 | 0.00639 | 0.00003 | 0.00217 | 0.06454 | 0.02673 | 0.00678 | 0.03464 |
| 0.00166 | 0.00988 | 0.00518 | 0.00435 | 0.00659 | 0.00016 | 0.00313 | 0.0515 | 0.03006 | 0.01004 | 0.04037 |

Fig. 4

METHOD AND APPARATUS FOR AUTOMATICALLY ANALYZING NATURAL LANGUAGE TO EXTRACT USEFUL INFORMATION

CONTINUITY AND CLAIM OF PRIORITY

This is an original U.S. patent application.

FIELD

The invention relates to natural language processing. More specifically, the invention relates to machine-implemented methods of extracting useful information from messages written in a natural or human language.

BACKGROUND

Automated or machine processing of natural language has long been an active area of research and development. Older work often focused on developing a semantic framework, with a text-to-semantics front end processor so that a computer could read an English (or other language) passage and build a representation of its contents that was adequate to make inferences or to answer questions about it. For example, upon processing the sentence "John drove his car to work," the framework would "understand" that John was a person, that he used a machine called a car to go to a place called work, that the car probably traveled over a road and not over water or through the air, and so on. Within certain limited universes, these semantic frameworks can be very powerful (for example, medical expert systems can improve the efficiency and accuracy of doctors' clinical diagnoses) but general reading comprehension remains out of machines' reach.

More recently, statistical natural language processing has delivered some of the most impressive results. In statistical NLP, computers simply examine huge volumes of text to develop rules about what letters, words and phrases go together, without constructing anything that could be considered an understanding of what the text means. Despite the lack of understanding, statistical NLP underlies feats such as real-time machine translation. Machine translations are usually inferior to a human's work, and occasionally computers produce absurd errors or incoherent output, but the approach is still valuable for its high capacity and low expense. In machine learning classifiers, Bayesian and other probabilistic techniques are used to "learn" words, word roots, and word combinations that match with human-classified categories. These classifiers are often used to classify text articles as "positive" or "negative" after learning patterns from human-labeled documents.

Despite the impressive accomplishments in niche applications and recent statistical NLP advances, unsolved natural-language processing problems remain. For example, there is an enormous amount textual information about financial markets (everything from Securities and Exchange Commission filings and corporate annual reports to newspaper articles and Internet message-board postings); and detailed information about actual market transactions is readily available. It seems that a machine should be able to extract information from the text and produce predictions about market developments, but neither semantic nor statistical methods have made much progress towards that goal.

New methods for machine analysis of natural-language text messages to predict financial market directions may be of great value.

SUMMARY

Embodiments of the invention use a programmable processor to perform analysis of natural-language text, producing signals indicating the presence of abstract sentiments. Grammar processing augments the sentiment signal with characteristics such as time, intensity, and quantity. Finally, statistical processing identifies significant trends that may be predictive of interesting events or conditions.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 3 represents a distributed computation environment where an embodiment of the invention may be deployed.

FIG. 4 shows a sample excerpt from a tabular report generated according to an embodiment.

DETAILED DESCRIPTION

Figure 1:
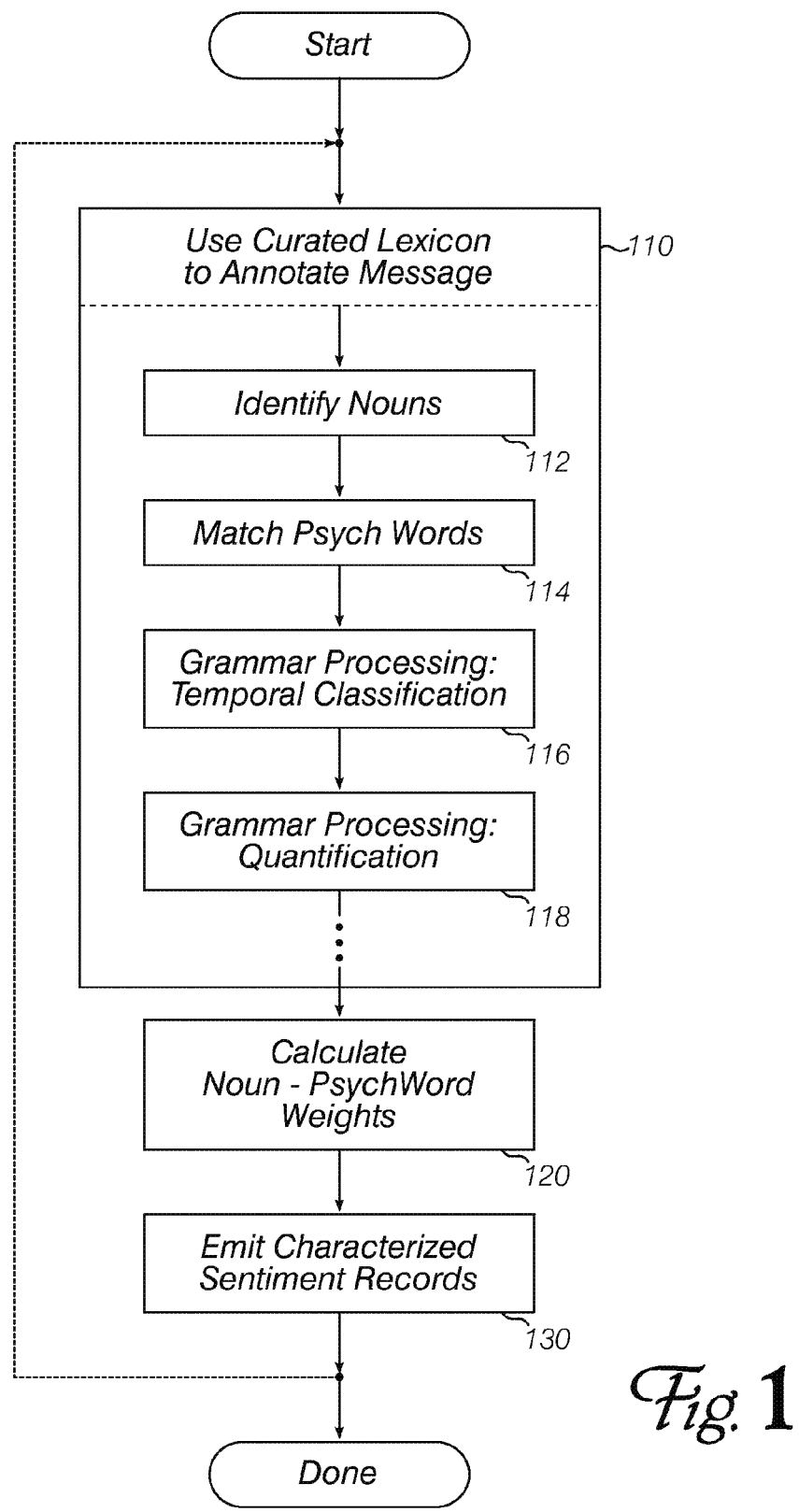
FIG. 1 shows an overview of a method according to an embodiment of the invention.

Embodiments of the invention perform automatic machine processing of natural language information from sources such as stock message forums and news publishers to produce high-dimensionality sentiment analytics for financial applications. The analytics can be used to predict price movements and economic activity across a broad spectrum of asset classes.

A simple example may be the best way to illustrate a system operating according to the inventive principles. Consider the following excerpt from a short financial news item:

GOTHAM (AP) Spacely Sprockets, Inc. said its chairman and CEO is stepping clown and its directors will be replaced as an agreement to be acquired by billionaire investor Montgomery Burns was terminated.

The shake-up is at least a partial victory for Cheatham Capital, one of Spacely's biggest shareholders. Cheatham had sought to replace Chairman Lucius Fox and opposed Burns' $665 million offer. That offer expired Friday afternoon, failing to get sufficient support from shareholders.

Fox will resign as a director and chairman effective immediately. He will step clown as CEO and president on March 11. At that time, [ . . . ]

An embodiment can process this message by annotating certain words, combinations of words, and phrases according to entries in a human-curated lexicon; performing several grammatical analysis tasks on the annotated message; and finally by reporting the message's scores on a number of metrics. For the first sentence of the sample news item, the annotation might include:

GOTHAM$^{Place}$ (AP) Spacely Sprockets, Inc.$_{SS,Stock}$ said$^{PastTense}$ its chairman$^{Management}$ and CEO$^{CEO,Management}$ is$^{PresentTense}$ stepping down$^{Change,Down}$ and its directors$^{Management}$ will$^{FutureTense}$ be replaced$^{Change}$ as an agreement to be acquired$^{Up}$ by billionaire investor$^{Investors}$ Montgomery Burns$^{Person}$ was terminated$^{PastTense,Bear}$.

The lexicon contains entries for places (e.g., Gotham), important companies (e.g., Spacely Sprockets) and their ticker symbols, and well-known people (e.g., Montgomery Burns), as well as nouns and phrases indicating subjects and topics of interest to financial analyses (e.g., chairman, director and CEO are all nouns having to do with company Management; step clown and replace often indicate Change, and acquisition is often a favorable event). As this sample annotation shows, verb tenses are also noted.

Some words and phrases may match multiple lexicon entries. For example, "stepping clown" is a Change event, while "clown" alone is a direction word. An embodiment need not attempt to distinguish between these different meanings; it is sufficient to add the Change annotation when a form of the verb "step" appears near the word "clown," and the Down or Direction annotation when the word "clown" is observed.

A sample annotation of the second paragraph shows additional features that may be flagged by lexicon comparisons or mechanical grammatics:

The shake-up$^{Volatility}$ is at least a partial$^{Possibility}$ victory$^{Success}$ for Cheatham Capital$^{Investor}$, one of Spacely's biggest$^{Big}$ shareholders$^{Investor}$. Cheatham had sought to replace$^{Change}$ Chairman$^{Management}$ Lucius Fox$^{NWS,Stock}$ and opposed$^{Conflict}$ Burns' $665 million offer. That offer expired$^{Past,End}$ Friday afternoon, failing$^{Failure}$ to get sufficient$^{Adequate}$ support$^{Safety}$ from shareholders$^{Investor}$.

To avoid obscuring the new features shown in this annotation, most simple nouns and verb-tense notations have been omitted. It is appreciated that the annotation may make errors, such as the identification here of Chairman Lucius Fox's last name as the name of a news-like entertainment broadcasting company.

As shown in this portion of the annotation, some entries in the lexicon match words and phrases and attach notations such as "Volatility," "Conflict" and "Safety." Hereafter, these sorts of matches will be referred to as "Psych Categories" (the words and phrases to be matched are "Psych Words"). The lexicon contains the word(s) or phrases to be matched, and the Psych Category annotation(s) to be applied when a match is found. As a practical matter, the lexicon may be structured as "if-then" search strings. For example, a search string of "step* w/2 clown" (to match a form of the verb "step" within two words of the word "clown") associated with a "Change" consequent could cause the annotation of "stepping clown" that was seen in the example annotation at [0015].

The Psych Categories annotation may be thought of as a translation of the article into a different conceptual space: the presence of certain Psych Words suggests that themes of the article include those abstract qualities. Of course, the translation is purely mechanical; the system has no independent understanding of the article and cannot answer questions about the events that transpired. However, it can easily report, for example, that an "Investor" class word appears within two words of a "Safety" class word (at the last three words of the second paragraph). Another evocative, though not strictly descriptive, way of thinking about the invention is that it summarizes material from the "firehose" of information confronting investors and provides them with useful, concise and text-based, but nonetheless numerically comparable, summaries, allowing them to ask, for example, "what is the overriding sentiment regarding the possibility of management change at Google?" The Psych Category "Management-Change" associated with the ticker symbol GOOG provides a numeric answer.

Once a message has been fully annotated (which, again, is a completely mechanical process, notwithstanding that suggestive or apparently-meaningful names may be used for many of the Psych Category labels), the system assigns weights to annotated words based on their lexical distance from the nearest noun. In one embodiment the weights are assigned on an eleven-point scale, from 0.0 to 1.0 by tenths, where 1.0 is the weight assigned an immediately adjacent word, while 0.0 is ten or more words away. (Weights may be scaled according to the presence of certain modifier words, as explained below, so weights outside the range of 0.0 to 1.0 may be encountered.) Allowance is made for punctuation, sentence boundaries and so on by a series of rules: an exclamation point or full stop counts for ten words, while a comma counts for five words (as do "reversal" words such as "but" and "however"). Several words called "StopWords" (e.g., "a," "the," "in," "after," and "to") are ignored in the calculation of weights.

The results of this annotation and analysis are delivered as tuples that may be in the form:

Noun-Psych Word-Time-Weight for example, from the first portion of the example annotation of "Spacely Sprockets, Inc. said its chairman and CEO is stepping clown . . . " the tuples Management-Change-Present-0.7
Management-Change-Present-0.8 reflect that the "Management"-class nouns "CEO" and "chairman" appear two and three words away from the "Change" annotation of "stepping clown," and are associated through the present-tense word "is." Similarly, the tuple Management-Change-Future-0.8 corresponds to the annotation of " . . . its directors will be replaced . . . "

FIG. 1 is a flow chart outlining the message processing operations. For each message of a plurality of messages, the system annotates the message according to a lexicon (110), similarly to the example related above. In particular, words, word combinations and phrases that represent "noun" concepts are identified (112), words and phrases matching Psych Category search strings are given corresponding annotations (114), verb grammar processing detects temporal indicators (past, present, future, conditional) (116), and quantitative grammar processing detects numeric, comparative, superlative and similar structures (118). Some embodiments may apply other, more sophisticated (but nevertheless mechanical) processing steps to attach additional notations to words or portions of the message. For example, a grammar processing step may provide "logical" annotations to invert the sense of a phrase, so that the system can interpret phrases like "Analysts expect higher earnings," "Analysts expect lower earnings," "Analysts do not expect higher earnings," and "Analysts do not expect lower earnings" in a reasonable way. Another syntactic/grammar processing step may attempt to identify the speaker of a statement—that is, who is making the statement about the company? Is it an Investor-class person, a member of company Management, or simply the author of the message? In addition, most embodiments will have access to metadata about the message, such as its source, author and publication date.

The nouns and Psych Words in the annotated message are next measured and weighted by lexical distance (120), as discussed above. An embodiment need not use any particular scale, but for processing English-language messages, it is preferred to use weights that are inversely proportional to the distance between the words. Empirically, it has been determined that the effectiveness of this mechanical method for extracting meaningful (i.e., predictive) information from a message drops off when relating words that are separated by more than about 15 or 20 other words.

Finally, the noun-psych category-time-weight tuples are emitted as "sentiment indicators" of the message (130).

Note that the words to match and the match's corresponding Psych Category may be more sophisticated than a simple thesaurus linking, say, several words or phrases dealing with bankruptcy: "bankrupt," "bankruptcy," "Chapter 11," "default" and "insolvent;" with the Psych Category "CatastrophicFinancialEvent." For example, the lexicon might have entries for "audit*" (forms of the word "audit," such as "audited" and "auditing") with "Accounting," while "audit* w/3 irregular*" (forms of "audit" near forms of "irregular") might be linked with "AccountingBad." An electronic copy of a portion of a lexicon is submitted in CSV ("comma-separated value") form with this Application; but the selection, testing and refinement of lexicon entries is within the capabilities of those of ordinary skill in these arts, once they are armed with the knowledge that this matching and weighting process produces useful results with predictive power.

Another example may help to further illustrate operations according to an embodiment. Consider the following sentence, which might be encountered during processing of a financial newswire article:

Analysts expect Mattel to report much higher earnings next quarter.

An embodiment may perform the following steps:

Identify "earnings" as a "PositiveAccounting" word in the lexicon

Identify "analysts" as an "Investor" word

Identify "higher" as an "Up" word

Multiply "higher" by two due to modifier word "much"

Associate "higher" (2×Up) with "earnings" (PositiveAccounting) due to proximity

Assign future tense to the phrase due to the presence of the word "expect"

Associate ticker symbol MAT with company name Mattel

The tuple resulting from this processing is:

MAT-AccountingGood-Future-2.0 where "AccountingGood" is a final "meaning" output that results from the proximity of a positive quantity ("much higher") and a PositiveAccounting word. Compare, for example, the structurally-similar sentences:

Analysts expect Mattel to report much lower earnings next quarter.

Analysts expect Mattel to report much higher losses next quarter.

Analysts expect Mattel to report much lower losses next quarter.

"Much higher" with the NegativeAccounting word "losses" produces an "AccountingBad" meaning, while "much lower" with the NegativeAccounting word "losses" produces an "AccountingGood" meaning.

One additional aspect of the automatic processing deserves further examination. As one might expect, it is useful to associate sentiments expressed in messages with specific companies, since the association and/or trends may suggest that the company will experience a gain (or loss) in excess of what might be expected if one had not encountered the message. For some messages (such as the sentence discussed in [0028]-[0030]) the association is obvious: only one company is mentioned in the sentence, so the sentence is likely to be about that company. For other messages, the company may be implicit: SEC filings by a company, annual reports, conference transcripts, and message boards dedicated to discussion of the company, are all likely to concern that company.

For messages lacking such intrinsic identification, a more-sophisticated matching process may be used. When no single ticker or company is mentioned in the headline and more than 75% of the article, the article is broken down by phrases and analyzed by word distance, with twice the weightings to a ticker in the words following it when another ticker has not appeared. However, punctuation ends the weightings unless a "co-reference" (continuation words to indicate that a subject of the prior sentence should be continued without dilution—words such as "The company," "It," "The firm reports," etc) is present. For example, in "ACME, Inc. reports higher than expected earnings. The company said 'We're the best!'" both sentences are attributed to ACME.

In a sub-case of mixed tickers, an embodiment may also use "Comparison Words" ("similar to," "just like," "equally") and "Contrast Words" ("more than," "better than," "losing to") to determine which company (if any) is the dominant one in the sentence. For example, in "GOOG earned more than IBM last quarter. The CEO said 'we're better than them.'" "Management" ("CEO"), "Better," etc. apply to GOOG rather than IBM.

Figure 2:
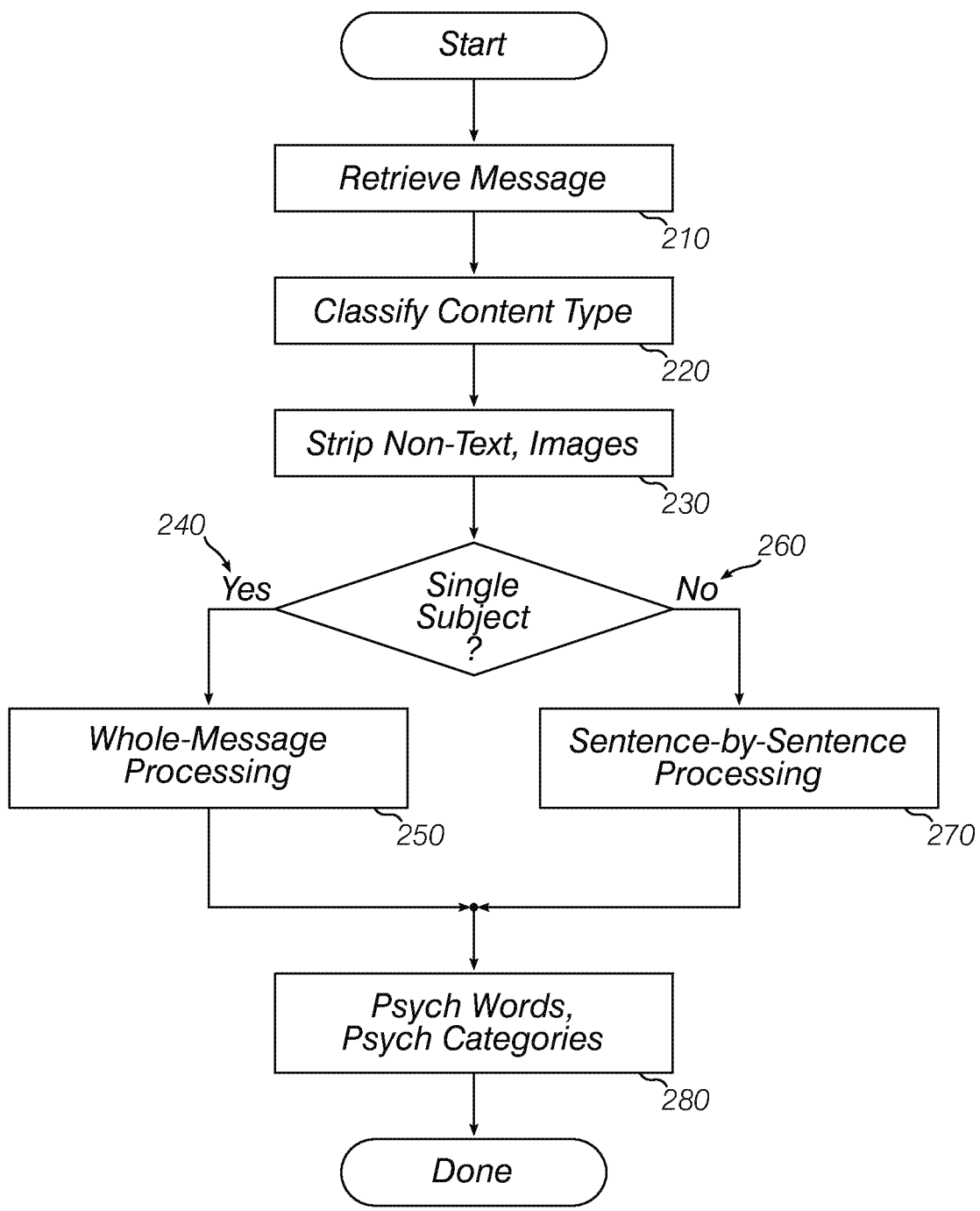
FIG. 2 places the method of FIG. 1 within a method of a comprehensive system embodying the invention.

The core automatic message analysis outlined in FIG. 1 can be used in a message-processing pipeline as explained in the flow chart of FIG. 2. First, a message is retrieved (210) from one of the sources mentioned elsewhere. The content type is classified (220), principally depending on the identity of the source. Next, portions of the message that are not natural language (e.g., images, HTML formatting and so on) are stripped (230). If the message refers to a single subject (company) (240), then it is processed as a whole (250). Otherwise (260), sentence-by-sentence processing may be appropriate (270). The psych words and categories that result from the processing explained in greater detail with reference to FIG. 1 are produced and stored in a database (280), then the pipeline may begin to work on the next message.

In some embodiments, tuples referring to the same subject are aggregated, and scores are divided by the total scores for all Psych Categories (the total is called the "buzz"—the weight of all messages and phrases of interest over a period of time). This quotient gives an indication of how important (or commonly discussed) the subject is (or was) over the period. This is a form of normalization that allows equal-weight comparisons among numerous topics and nouns (such as stocks or individual companies).

A system employing an embodiment of the invention collects the sentiment data—many tuples from each message, and many messages—into a database that can be queried from several different aspects. For example, a researcher may wish to see the "Conflict—past" scores for a company over a period of time, or the "AccountingBad—present" scores for an industry. Queries for the same Psych Category, but different time periods (past, present, future) can be synchronized according to the dates of the messages from which the tuples were taken, to determine whether the message authors' expectations of an event or occurrence were borne out.

One use of the data collected as described above is as a product in itself: a service may receive messages from one or more sources, process the messages according to a particular lexicon, and transmit the resulting tuples electronically to subscribers. Alternatively, a service provider may process the messages and store the results, and then accept queries from subscribers and return graphs or tabular data answering the query.

FIG. 3 places an embodiment of the invention within a more-complete environment, showing the "soup to nuts" of a viable business based on the data analysis and extraction process. At 310, a variety of input-data harvesters are shown. These collect natural-language messages from several different sources and feed them to the analysis process. A news harvester 312, for example, may collect stories from news publishing venues such as Dow-Jones, Reuters or the Associated Press. These may arrive individually in a "newswire" format, or be parsed out of an electronic periodical format. Another harvester 315 may search the databases of the U.S. Securities and Exchange Commission ("SEC"), returning statements filed by companies in satisfaction of their regulatory requirements. Other sources of input messages include press releases issued by companies, transcripts of quarterly conference calls conducted by large publicly-traded companies, websites and "blogs" that host discussions of interest to financial analysts and traders, and even the "tweets" from users of the short message service operated by Twitter.

All of these message collectors deliver electronic representations of the natural-language messages (typically including information about where, when and from whom the message was obtained) to the annotation and analysis process 320 explained in greater detail above. The outputs of the process, which may be information tuples of the sort described earlier, or another form that permits efficient post-processing, are stored in a database 330.

Customers of the data collection and analysis business may obtain the information and/or interact with the database through a number of different interfaces. The simplest is a raw, first-in, first-out feed of unscaled tuples 340, as they are produced during message processing. The tuples may also be collected for a predetermined period of time (such as 24 hours, perhaps starting and ending at a time relevant to financial activities of interest). For example, a "trading day" worth of tuples may be downloaded in an archive 350, containing messages from 9:00 A.M. Eastern Time one day, through to 8:59 A.M. Eastern Time the next day. Weights may be unscaled, or scaled by the buzz (total score) of the clay.

Data may also be offered as a (usually sparse) matrix of subjects vs. Psych Categories, aggregated over a predetermined period. An example subset of such a matrix is shown in FIG. 4. The matrix is quite wide—there are columns for every Psych Category that can be identified by words in the lexicon—so only the first 13 categories are shown in this excerpt, and even those are split into two portions as indicated by the double-headed, dashed arrow line. Column 410 lists subject stock ticker symbols, column 420 lists dates, column 430 provides company names, column 440 lists economic sector, column 450 lists a source type for the message, and column 460 lists the author of the message (no author information was available for the messages processed to produce this excerpt). Columns 470 and 480 list the first few Psych Categories. Each row of the matrix provides the scaled score for a ticker on each of the Psych Categories. A row of the matrix can also be thought of as a vector, with the company name in one position, and a plurality of scores (possibly normalized by buzz) in the other positions. (In a full-functioning embodiment, each Psych Category column would have a number of sub-entries, corresponding to conditional, future, present, past and "no time" scores—the latter being an aggregate of the other values.) The data delivery interface may allow customers to select some or all of stocks, subjects, date ranges, or Psych Categories.

An embodiment may also provide visualization tools internally: a customer would enter parameters to select data of interest, and the system would prepare and deliver a graph 360 showing the selected data. Some embodiments may provide additional graphical tools to allow customers to prepare comparative studies of sentiments from different times, different industries, or different subjects. Visualization functions may also display non-sentiment data, such as security prices and trade volumes, alongside the data extracted from the natural-language messages.

Another embodiment may perform searching or analysis of predetermined database records and transmit a message when a certain event or trend is detected. For example, a customer may submit a search condition that triggers when a company has normalized "Fear-Future" or "Conflict-Future" scores exceeding a first threshold, followed by an "EarningsBad-Present" score exceeding a second threshold. The message may be used by an automatic stock trading system to buy (or sell) the stock or a derivative financial product.

Or, instead of driving a trading system directly, the signal-detected message may be transmitted by electronic mail, text message or another means to the customer, who may treat the signal as a recommendation to make an investment decision. Some signals may correlate with standard economic indicators (often with a lead time) and may therefore be useful for producing economic forecasts.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that automatic analysis and extraction of sentiment signals can also be accomplished by software and hardware that distribute the functions of embodiments of this invention differently than herein described. Such variations and implementations are understood to be captured according to the following claims.

I claim:

1. A non-transitory computer-readable medium containing instructions to cause a programmable processor to perform operations comprising:
   analyzing a plurality of natural-language messages to identify predetermined words in the messages, said predetermined words including a company name and a financial assertion;
   applying a heuristic to attribute the financial assertion to a speaker making the financial assertion; and
   emitting a signal if the speaker is a member of a management team of a company having the company name, wherein the financial assertion refers to higher earnings.

2. A non-transitory computer-readable medium containing instructions to cause a programmable processor to perform operations comprising:
   analyzing a plurality of natural-language messages to identify predetermined words in the messages, said predetermined words including a company name and a financial assertion;
   applying a heuristic to attribute the financial assertion to a speaker making the financial assertion;
   determining a temporal indication from a tense of a verb in the financial assertion; and
   emitting a signal if the speaker is a member of a management team of the company having the company name and the temporal indication is a future indication.

* * * * *